UNITED STATES PATENT OFFICE.

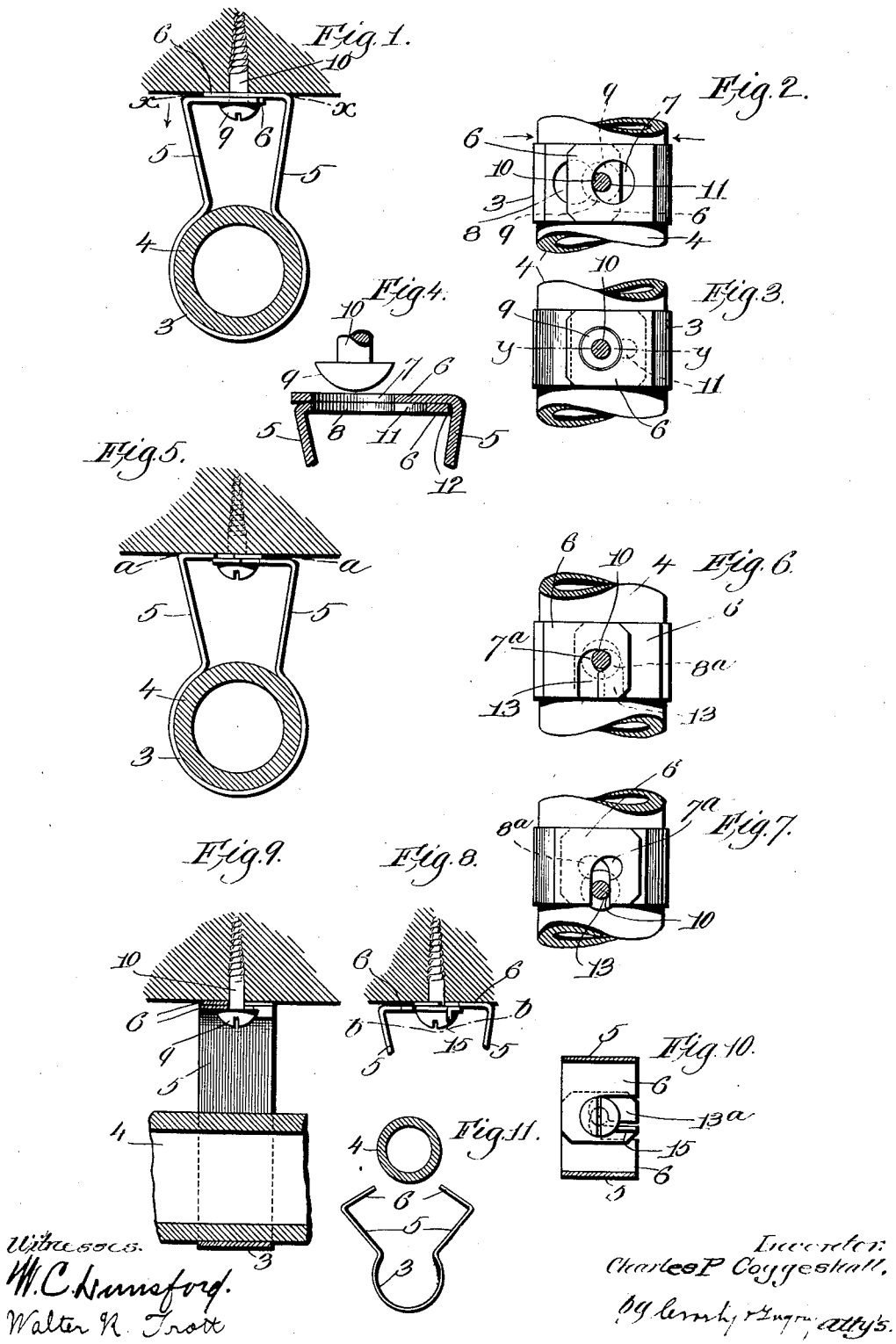

CHARLES P. COGGESHALL, OF BROOKLINE, MASSACHUSETTS.

PIPE-HANGER.

No. 832,296.  Specification of Letters Patent.  Patented Oct. 2, 1906.

Application filed October 19, 1905. Serial No. 283,453.

*To all whom it may concern:*

Be it known that I, CHARLES P. COGGESHALL, a citizen of the United States, and a resident of Brookline, in the county of Norfolk and State of Massachusetts, have invented an Improvement in Pipe-Hangers, of which the following description, in connection with the accompanying drawings, is a specification, like numerals on the drawings representing like parts.

This invention has for its object to provide a novel pipe-hanger which is simple and inexpensive to manufacture and which is extremely effective in operation.

The pipe-hanger is preferably made from a single piece of resilient metal and is provided with a seat portion to embrace and receive the pipe and with leg portions extending from the seat portion and terminating in inwardly-turned feet, which feet have openings to receive the shank of a headed stud or screw which is inserted in a ceiling or wall.

Some embodiments of the invention will now be described and then the novel features thereof will be pointed out in the claims.

In the drawings, Figure 1 is a side view of one form of pipe-hanger embodying my invention. Figs. 2 and 3 are sections on the line $x\ x$, Fig. 1, looking downwardly, Fig. 3 showing the legs of the pipe-hanger closed toward each other to bring the openings in the feet in line. Fig. 4 is an enlarged section through the feet of the legs of a pipe-hanger on the line $y\ y$, Fig. 3. Fig. 5 is a view similar to Fig. 1, showing a different form of the invention. Figs. 6 and 7 are sections on the line $a\ a$, Fig. 7, showing the legs of the pipe-hanger closed together to bring the openings in the feet thereof into alinement. Fig. 8 is a side view of the upper end of a pipe-hanger, showing another embodiment of the invention. Fig. 9 is a vertical section through the pipe-hanger shown in Fig. 8. Fig. 10 is a section on the line $b\ b$, Fig. 8. Fig. 11 is a view showing the manner of applying the pipe-hanger to a pipe.

My improved pipe-hanger will preferably be made of some resilient or elastic material, and it is shaped to present the seat portion 3, in which the pipe 4 is received, and the two leg portions 5, which extend upwardly from the seat portion and terminate in inwardly-directed feet 6. Each foot is provided with an opening which may be either in the nature of an aperture or in the form of a slot.

In the embodiment of the invention shown in Figs. 1 to 4 this opening is an aperture, the openings in the two feet being designated 7 and 8, respectively. Both the openings 7 and 8 are of a size to receive the head 9 of the screw or stud 10, by which the hanger is secured to the ceiling or wall, and the opening 8 is also formed in one side with a locking notch or recess 11.

The material of which the pipe-hanger is made is preferably resilient, so that it may be applied to the pipe by simply opening the legs away from each other, as shown in Fig. 11, until the feet are spread sufficiently to admit of their being passed over the pipe. The legs are then brought toward each other until the openings 7 and 8 come into alinement, as shown in Fig. 4, when said feet may be inserted over the head 9 of the screw or stud.

The resiliency of the legs 5 tends to separate them, so that as soon as the head 9 of the screw has been inserted through the openings 7 and 8 the legs separate from each other, and thus cause the shank of the screw to enter the locking-notch 11, as shown in Fig. 2. When in this position the hanger is firmly secured to the wall or ceiling, and the construction is such that the weight of the pipe only tends to separate the legs more, and thus cause the feet to more firmly hold to the screw. The length of the inner foot 6 is such that the outer edge 12 thereof forms a stop to limit the closing movement of the legs when the openings 7 and 8 come into alinement. In applying the pipe-hanger, therefore, it is only necessary to squeeze the legs 5 together until the edge 12 of the under foot 6 strikes the adjacent leg 5, as shown in Fig. 4, at which time the apertures 7 and 8 will be properly alined for receiving the head 9 of the screw.

In the embodiment of the invention shown in Figs. 1 and 4 the openings 7 and 8 are merely apertures, and the device is applied to the headed stud by slipping the apertures over the head of said stud, said apertures being large enough to receive the head. In the other embodiment of my invention the openings in the feet are in the nature of open-ended slots which are preferably only wide enough to receive the shank of the headed stud 10. For instance, in Figs. 6 and 7 the openings are in the nature of open-ended slots 13, there being one such slot in each foot, and each slot terminates in the side of the corresponding foot. The inner ends of the slots are offset slightly, as at $7^a$ and $8^a$, to form locking-notches, in which the shank of the stud 10 is received when the pipe-hanger is in place. To apply a pipe-hanger of this form, it is only necessary to close the legs 5 together as far as the inner foot 6 will permit, at which time the two slots 13 are in alinement, as shown in Fig. 7, and then to slip the hanger laterally onto the shank of stud or screw 10, said shank entering through the alined slots 13. When the shank of the screw has fully entered the slots, the resiliency of the material of the legs will cause said legs to separate, and the shank of the screw 10 will then find its place in the offset ends 7 and 8, as shown in Fig. 6. Since these ends of the slots are offset slightly, it will be impossible to detach the pipe-hanger from the screw except by first closing the legs 5 toward each other to bring the slots into alinement, as shown in Fig. 13.

In the embodiment of the invention shown in Figs. 8, 9, and 10 the pipe-hanger is prevented from coming off of the screw by a locking-flange 15, which depends from the side of one of the slots 13$^a$, this flange preferably being made by striking up part of the metal of said foot. In this embodiment the openings are in the form of slots; but the ends of the slots are not offset. The flange 15 is depended on for preventing the hanger from being withdrawn laterally from the screw, except when the two legs are pinched together to bring the slots 13$^a$ into alinement.

A pipe-hanger embodying my invention is simple to make and extremely easy to apply. It can be applied to the pipe at any point along its length by simply opening the legs away from each other, as shown in Fig. 11. It is also so constructed that the weight of the pipe therein tends to separate the legs, and thus more securely hold it to the screw or stud.

One advantage of making the pipe-hanger with legs is that when in place the pipe is spaced sufficiently from the wall or ceiling to permit attaching-screws to be inserted into the wall or removed therefrom.

Having described my invention, what I claim as new, and desire to secure by Letters Patent, is—

1. A pipe-hanger made from a band of resilient metal bent centrally to form a parti-cylindrical seat portion to receive the pipe, said seat portion forming an arc of more than a semicircle, said band being also bent to form a resilient leg projecting upwardly from each end of the seat portion, each leg having its end bent to form an inwardly-directed foot, each foot being provided with an opening adapted to be slipped over the shank of a headed supporting-stud without either removing the stud or removing its head.

2. A pipe-hanger made from a band of resilient metal bent to present a parti-cylindrical seat portion to embrace a pipe, an upwardly-directed leg extending from each end of the seat portion, and an inwardly-directed foot at each end of the leg, the seat portion being shaped to extend more than half-way around the pipe, said feet overlapping each other and each foot being provided with an opening adapted to be slipped over the shank of a supporting-stud without either removing said stud or its head, the edge of the inner foot constituting a stop to engage the opposite leg and thereby limit the movement of the legs toward each other when the openings are in alinement.

In testimony whereof I have signed my name to this specification in the presence of two subscribing witnesses.

CHARLES P. COGGESHALL.

Witnesses:
 LOUIS C. SMITH,
 EDWIN A. JACKSON.